United States Patent
Shirai et al.

(10) Patent No.: US 11,967,135 B2
(45) Date of Patent: Apr. 23, 2024

(54) LABELING SUPPORT METHOD, LABELING SUPPORT APPARATUS AND PROGRAM

(71) Applicant: NIPPON TELEGRAPH AND TELEPHONE CORPORATION, Tokyo (JP)

(72) Inventors: Yoshinari Shirai, Tokyo (JP); Yasue Kishino, Tokyo (JP); Shin Mizutani, Tokyo (JP); Takayuki Suyama, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 249 days.

(21) Appl. No.: 17/436,595

(22) PCT Filed: Feb. 25, 2020

(86) PCT No.: PCT/JP2020/007404
§ 371 (c)(1),
(2) Date: Sep. 4, 2021

(87) PCT Pub. No.: WO2020/179537
PCT Pub. Date: Sep. 10, 2020

(65) Prior Publication Data
US 2022/0172459 A1 Jun. 2, 2022

(30) Foreign Application Priority Data
Mar. 6, 2019 (JP) ................................ 2019-040914

(51) Int. Cl.
*G06F 17/30* (2006.01)
*G06F 3/0482* (2013.01)
(Continued)

(52) U.S. Cl.
CPC ........ *G06V 10/7747* (2022.01); *G06F 3/0482* (2013.01); *G06F 16/5866* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,452,086 B2 * 5/2013 Saund .................. G06V 30/422
715/810
10,163,146 B2 * 12/2018 Zhao .................. G06Q 30/0631
(Continued)

FOREIGN PATENT DOCUMENTS

JP  H09138804 A   5/1997
JP  200659036 A   3/2006
JP  2008242689 A  10/2008

OTHER PUBLICATIONS

Ikematsu et al. (2016) "An Efficient User Interface to Simplify TrainingProcess of Deep Learning for Image Recognition" IEICE Technical Report, vol. 115, No. 414.
(Continued)

*Primary Examiner* — Hung D Le (57) ABSTRACT

A computer executes a display procedure of displaying a list of character strings registered in advance in response to a predetermined operation for data forming a part of a web page; and a storage procedure of storing a character string selected by a user from the list into a storage device in association with the data, to thereby achieve more efficient labeling of data.

18 Claims, 12 Drawing Sheets

(51) Int. Cl.
*G06F 16/58* (2019.01)
*G06V 10/774* (2022.01)

(56) References Cited

U.S. PATENT DOCUMENTS

| | | | |
|---|---|---|---|
| 10,319,035 B2* | 6/2019 | Nelson | H04N 7/181 |
| 10,666,840 B2* | 5/2020 | Kang | H04N 7/01 |
| 2015/0242706 A1* | 8/2015 | Brown | G06V 20/35 |
| | | | 382/224 |
| 2016/0071185 A1* | 3/2016 | Zhao | G06Q 30/0631 |
| | | | 705/26.7 |
| 2017/0109615 A1* | 4/2017 | Yatziv | G06F 18/24323 |
| 2017/0185670 A1* | 6/2017 | Dua | G06F 16/50 |
| 2017/0223235 A1* | 8/2017 | Kang | G06V 30/413 |

OTHER PUBLICATIONS

Panagiotis G. Ipeirotis (2010) "Analyzing the Amazon Mechanical Turk Marketplace" ACM XRDS, vol. 17, No. 2, pp. 16-21.

* cited by examiner

| USER ID | PASSWORD |
|---|---|
| way | ******* |
| shirai | ******* |
| yamamoto | ******* |
| ... | ... |

| LABEL ID | LABEL NAME | LABEL OUTLINE |
|---|---|---|
| 0000 | IMAGE OF JAPANESE ROSY BITTERLING LAYING EGGS | PLEASE GATHER IMAGES OF JAPANESE ROSY BITTERLING LAYING EGGS |
| 0001 | IMAGE OF ANGRY BEAR | I WANT IMAGES OF ANGRY BEAR TO BE GATHERED |
| 0002 | IMAGE OF MIST | I WANT IMAGE OF MIST |
| ... | ... | ... |

| USER ID | LABEL ID | PAGE URL | IMAGE URL | REGISTRATION DATE AND TIME |
|---|---|---|---|---|
| way | 0000 | http://www.abc.xyz/index.html | http://www.abc.xyz/img1.jpg | 2019/1/15 12:11:11 |
| yamamoto | 0002 | http://www.bcd.xyz/home.html | http://www.bcd.xyz/img/kiri.png | 2019/1/15 13:10:43 |
| shirai | 0000 | http://www.cde.xyz/biotope/ | http://www.cde.xyz/tanago.jpg | 2019/1/16 10:20:05 |
| way | 0001 | http://www.kuma.kuma/index2.html | http://www.kuma.kuma/kuma03.png | 2019/1/20 08:59:35 |
| ... | ... | ... | ... | ... |

LABELING SUPPORT METHOD, LABELING SUPPORT APPARATUS AND PROGRAM

CROSS-REFERENCE TO RELATED APPLICATIONS

This application is a U.S. 371 Application of International Patent Application No. PCT/JP2020/007404, filed on 25 Feb. 2020, which application claims priority to and the benefit of JP Application No. 2019-040914, filed on 6 Mar. 2019, the disclosures of which are hereby incorporated herein by reference in their entireties.

TECHNICAL FIELD

The present invention relates to a labeling assistance method, a labeling assistance device, and a program.

BACKGROUND ART

Development of research on deep learning and higher performance of a computer have recently improved the accuracy of image recognition, sound recognition, natural language processing, and other processing drastically. A large amount of training data supports the improvement in accuracy. In image recognition, a large amount of correct images labeled with objects (e.g., dog or cat) to be recognized are prepared, and a computer learns those images to create a recognizer. Then, an image is input to the created recognizer, to thereby be able to determine whether an object shown in the image is a dog or a cat.

A data set that can be used as training data is publicly available on the Internet, and an available image with a label for image recognition can be downloaded from, for example, ImageNet or Kaggle. It is also possible to automatically collect an image on the Internet by using the technique of crawling or scraping, for example. For example, it is technically possible to collect a large number of images, which are obtained from an image search result on a search site, by using the technique of scraping.

However, publicly available training data or data obtained by using the technique of scraping, for example, is highly general, and training data that fits individual needs has hitherto been required to be self-produced. For example, a result obtained by inputting training data labeled with a dog or a cat, or a keyword such as a dog or a cat into an image search system of the search site is useful for distinguishing between dog and cat images. However, training data labeled with sex and a more specific breed such as a male Akita dog or a female Abyssinian is not publicly available in many cases, and a result obtained by searching using those keywords in the image search system includes many different breeds of dog and cat images, and thus the training data cannot be used as it is. When a recognizer is used to perform, for example, determination of sex and a more specific breed (e.g., female Abyssinian), determination of a behavior (jumping cat), or determination including a subjective evaluation (cat with sad expression), it is necessary to individually prepare a large amount of image data with such labels.

An outline of a fool for assisting labeling of an image retrieved on the Internet is proposed in order to individually create training data for, for example, image recognition efficiently (NPL 1). Google (registered trademark) has opened a service that allows selection of a category for an image in order to improve the search quality, for example. In this manner, it is conceivable to adopt a method that allows labeling on a specific web page.

A method that uses fee-based crowdsourcing is also known. In Amazon Mechanical Turk (AMT), for example, such data can be created by crowdsourcing (NPL 2).

CITATION LIST

Non Patent Literature

[NPL 1] Taishi Ikematsu, Toshihiro Nakae, Fujie Nagamori, et al. "An Efficient User Interface to Simplify Training Process of Deep Learning for Image Recognition", IEICE Technical Report, 2016.
[NPL 2] Ipeirotis, P. G. "Analyzing the Amazon MechanicalTurk marketplace", ACM XRDS, Vol. 17, No. 2(2010)

SUMMARY OF THE INVENTION

Technical Problem

However, it is difficult to create training data at a low cost and within a short period of time even when such a labeling tool or crowdsourcing service is used.

First, even when the tool as described in NPL 1 is used to achieve higher efficiency, it takes a considerable amount of time to create a "large amount of" data necessary for deep learning. This amount of time can be reduced by creating data by a large number of people, but it is difficult to cause the general public to use the conventional tool. This is because the general public does not have a motive to perform labeling by using a tool. The labeling tool is independent of a general-purpose browser that is normally used by a large number of people at the time of viewing information on the Internet, which requires a strong motive to set up the labeling tool, get familiar with its usage, and use the labeling tool.

However, the general public does not have a motive for individual needs. For example, when some researcher considers creating a recognizer of "jumping cat", a person without a desire to search for "jumping cat" does not consider using such a labeling tool.

In other words, the general public does not have a motive to overcome a psychological hurdle (unwillingness to set up tool and learn its usage, or to perform labeling task, which is not immediately useful) to using such a new tool to perform labeling.

When a user is asked to perform labeling on a web site as well, the user cannot be said to have a low psychological hurdle in that the user takes the trouble to move to the web site and performs labeling, an effect of which cannot be exhibited immediately. It is considered that a large number of people cannot find out a motive to perform labeling. The crowdsourcing service like AMT provides a financial reward to give a motive, but when a large amount of image data with a label is required, a requester of the labeling task bears a large financial burden.

The present invention has been made in view of the above-mentioned points, and has an object to achieve more efficient labeling of data.

Means for Solving the Problem

In order to solve the above-mentioned problems, a computer executes: a display procedure of displaying a list of character strings registered in advance in response to a predetermined operation for data forming a part of a web page; and a storage procedure of storing a character string selected by a user from the list into a storage device in association with the data.

Effects of the Invention

It is possible to achieve more efficient labeling of data.

DESCRIPTION OF EMBODIMENTS

Figure 1:
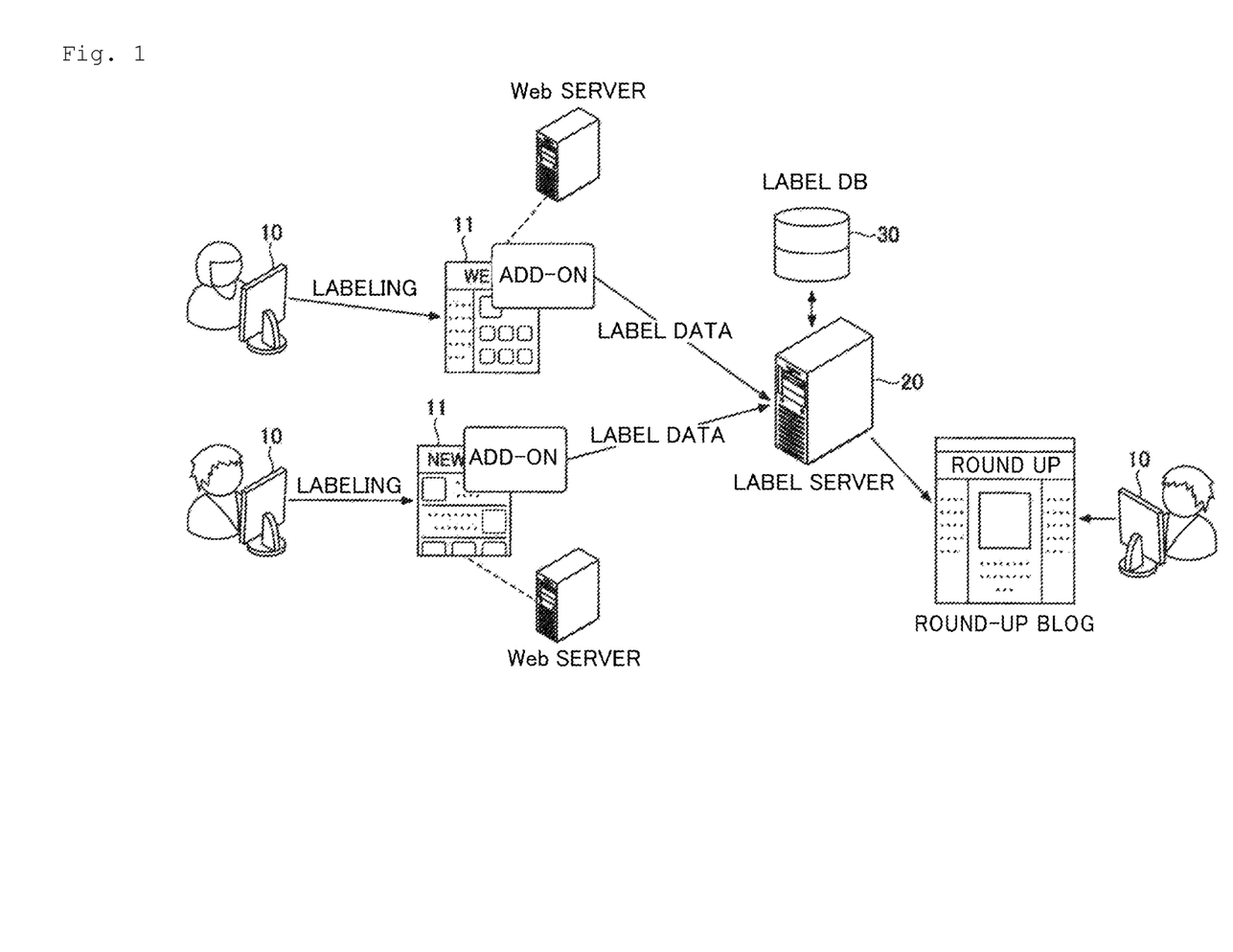
FIG. 1 is a diagram for describing an outline of an embodiment of the present invention.

Now, referring to the drawings, description is given of an embodiment of the present invention. FIG. 1 is a diagram for describing an outline of an embodiment of the present invention.

A user performs a labeling task by using a user terminal 10 including a web browser 11 having installed an add-on feature (e.g., Chrome Extension). The add-on feature first downloads a label request list (list of labels to be given to (assigned to) images) from a labeling server 20, and displays the label request list. The user selects one or more labels, which are to be used for labeling (creating a round-up blog) by himself or herself, from the list. When the user has found image data corresponding to any one of the selected labels during web browsing, the user assigns, to the image data, a corresponding label from among the selected labels. The add-on feature transmits the assigned label and a URL or other data of the selected image data to a labeling server 20 as label data. The labeling server 20 stores the transmitted label data into a label DB 30.

Meanwhile, when some user has input a URL of the labeling server 20 into the web browser of the user terminal 10 at a timing asynchronous with the above-mentioned task, the labeling server 20 generates a web page (hereinafter referred to as "round-up page") of a round-up blog of labeled image data based on data accumulated in the label DB 30, and transmits a response including the round-up page in response to an HTTP request addressed to the URL.

Figure 2:
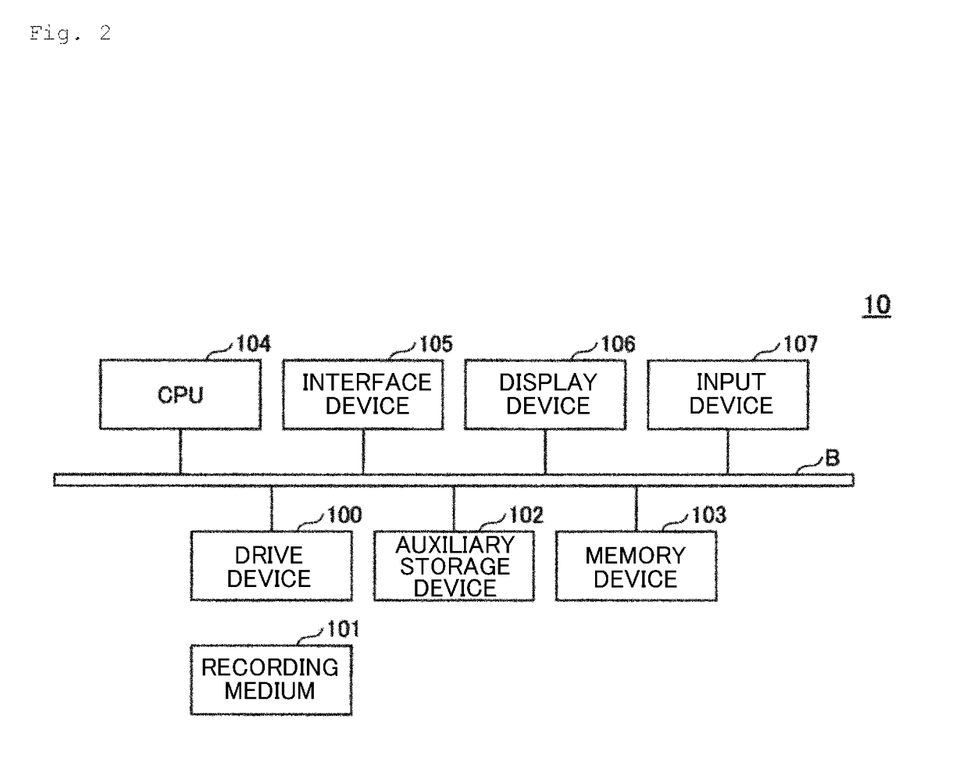
FIG. 2 is a diagram illustrating an example of a hardware configuration of a labeling server 20 in an embodiment of the present invention.

FIG. 2 is a diagram illustrating an example of a hardware configuration of the user terminal 10 in an embodiment of the present invention. The user terminal 10 of FIG. 2 includes, for example, a drive device 100, an auxiliary storage device 102, a memory device 103, a CPU 104, an interface device 105, a display device 106, and an input device 107, which are connected to one another via a bus B.

A program that implements the processing of the user terminal 10 is provided by a recording medium 101 such as a CD-ROM. When the recording medium 101 storing the program is set in the drive device 100, the program is installed from the recording medium 101 into the auxiliary storage device 102 via the drive device 100. The program is not required to be installed from the recording medium 101, and may be downloaded from another computer via a network. The auxiliary storage device 102 stores the installed program, and at the same time, stores a necessary file or data, for example.

When the memory device 103 receives an instruction to activate the program, the memory device 103 reads out the program from the auxiliary storage device 102, and stores the program. The CPU 104 implements a function of the user terminal 10 in accordance with the program stored in the memory device 103. The interface device 105 is used as an interface for connecting to the network. The display device 106 displays, for example, a graphical user interface (GUI) by using the program. The input device 107 is constructed by, for example, a keyboard and a mouse, and is used for inputting various kinds of operation instructions.

An example of the user terminal 10 is a computer that enables viewing of a web page, such as a personal computer (PC), a smartphone, or a tablet terminal.

Figure 3:
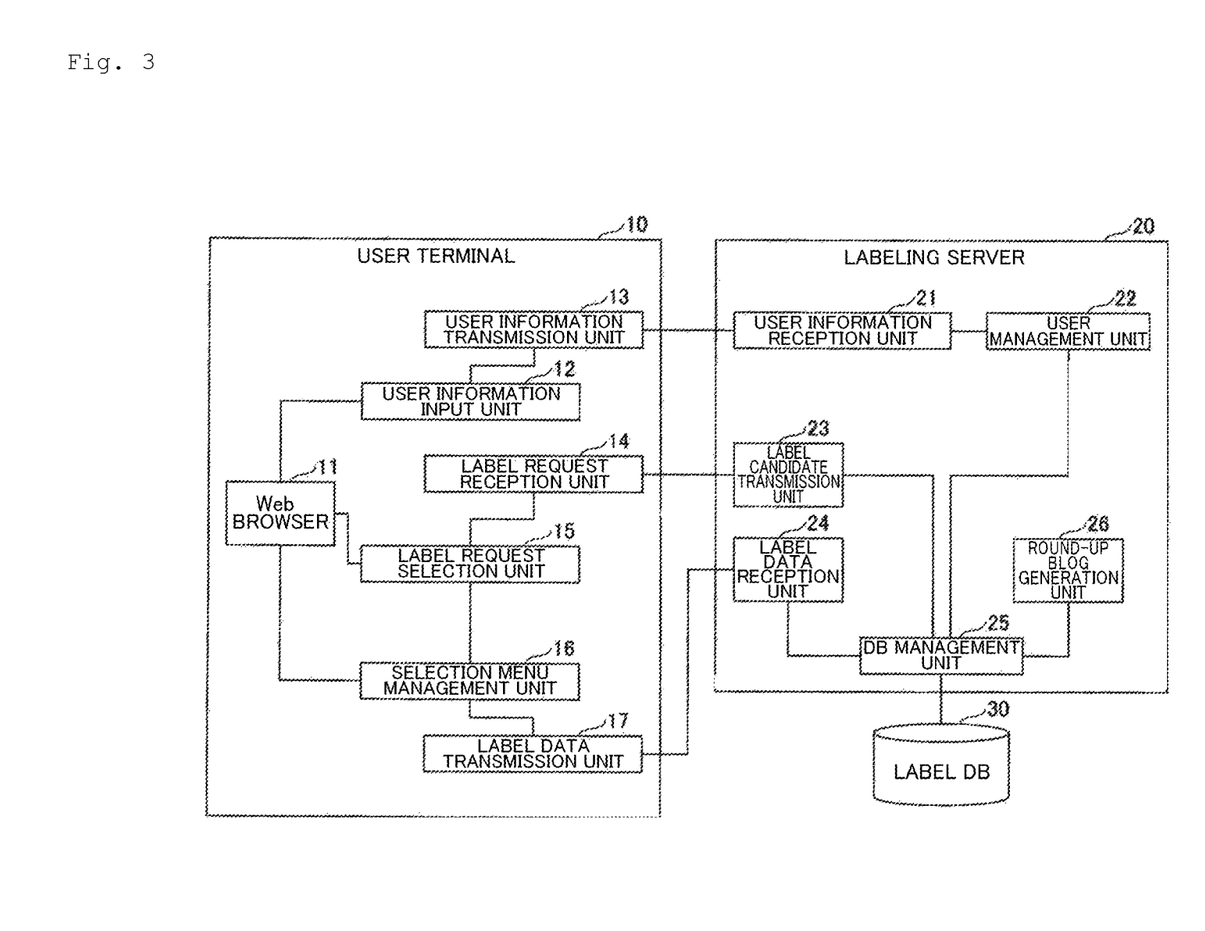
FIG. 3 is a diagram illustrating an example of a functional configuration of a user terminal 10 and the labeling server 20 in an embodiment of the present invention.

FIG. 3 is a diagram illustrating an example of a functional configuration of the user terminal 10 and the labeling server 20 in an embodiment of the present invention. In FIG. 3, in addition to the web browser 11, the user terminal 10 includes, for example, a user information input unit 12, a user information transmission unit 13, a label request reception unit 14, a label request selection unit 15, a selection menu management unit 16, and a label data transmission unit 17. These units are implemented by processing executed by the CPU 104 of the user terminal 10 in accordance with the program (e.g., add-on feature added to web browser 11) installed into the user terminal 10.

Meanwhile, the labeling server 20 includes, for example, a user information reception unit 21, a user management unit 22, a label candidate transmission unit 23, a label data reception unit 24, a DB management unit 25, and a round-up blog generation unit 26. These units are implemented by processing executed by the CPU of the labeling server 20 in accordance with one or more programs installed into the labeling server 20. The labeling server 20 also uses the label DB 30. The label DB 30 can be implemented by, for example, an auxiliary storage device of the labeling server 20 or a storage device that can connect to the labeling server 20 via a network.

Figure 4:
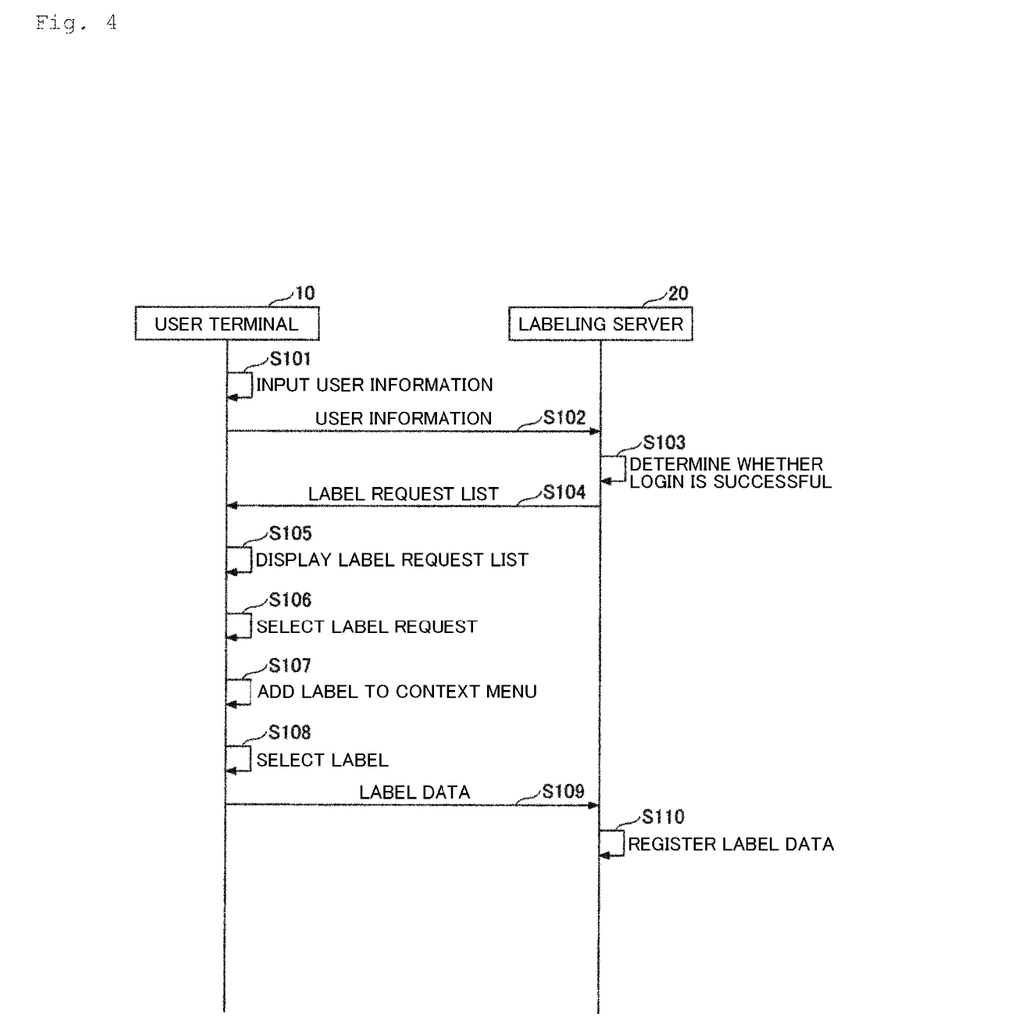
FIG. 4 is a sequence diagram for describing an example of a processing procedure of labeling processing.

Now, description is given of a processing procedure to be executed by the user terminal 10 and the labeling server 20. FIG. 4 is a sequence diagram for describing an example of a processing procedure of labeling processing.

Figure 5:
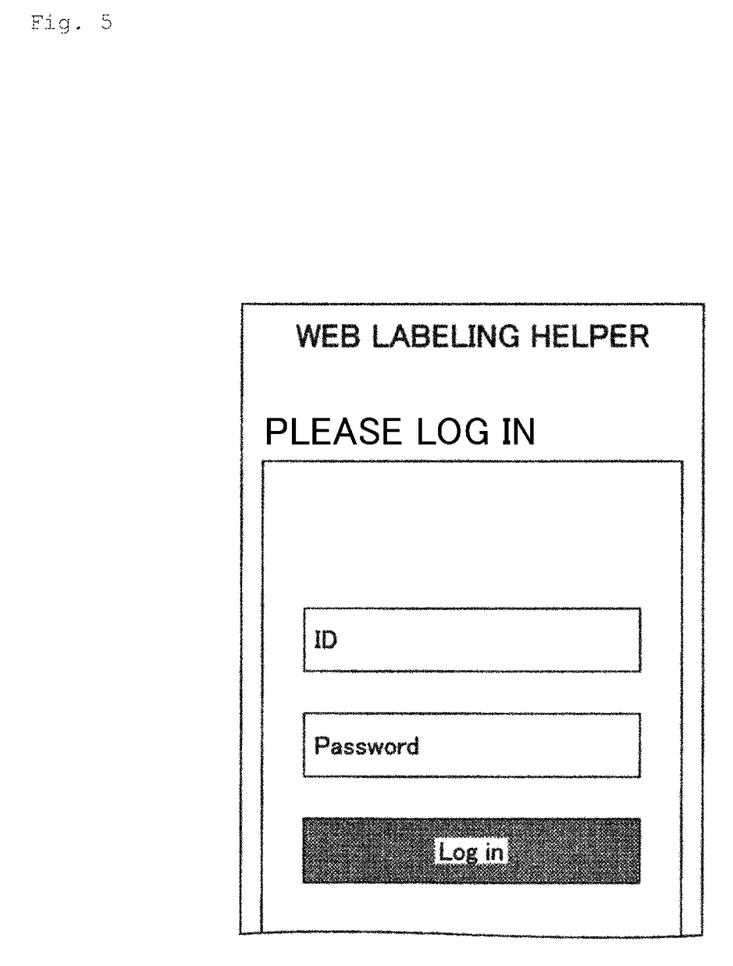
FIG. 5 is a diagram illustrating an example of display of a login screen.

When an add-on feature is activated in the user terminal 10 in response to activation of the web browser 11, the user information input unit 12 displays a login screen (FIG. 5) for inputting user information, and receives input of user information such as a user ID and a password from the user via the login screen (S101). Next, the user information transmission unit 13 transmits the user information to the labeling server 20 (S102).

When the user information reception unit 21 of the labeling server 20 has received the user information, the user management unit 22 determines whether to allow login based on the user information (S103). Specifically, the user management unit 22 determines whether the user information is registered in a user table T1 registered in the label DB 30.

Figure 6:
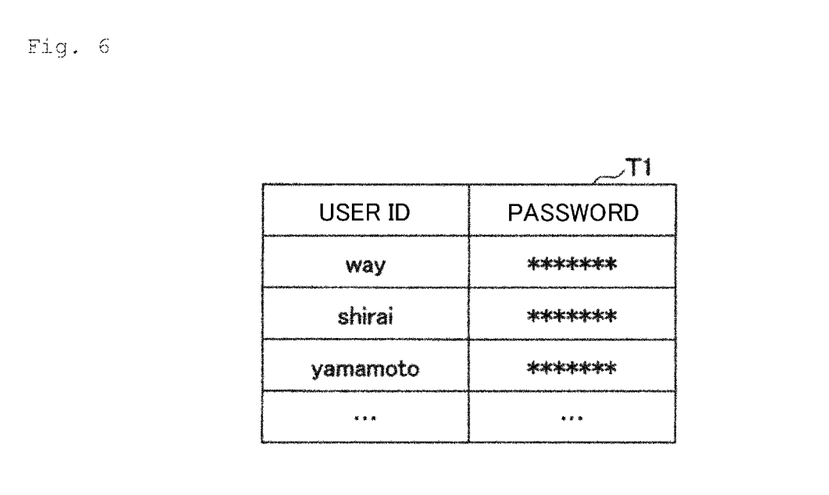
FIG. 6 is a diagram illustrating an example of a configuration of a user table T1.

FIG. 6 is a diagram illustrating an example of a configuration of the user table T1. As illustrated in FIG. 6, the user table T1 stores a user ID and password of each user who is allowed to use a service provided by the labeling server 20.

The user management unit 22 determines that login is successful and starts the service when a record for which the received user information and the user ID and password match each other is registered in the user table T1. When login is successful, the label candidate transmission unit 23 transmits a list (label request list) of label requests registered in a label table T2 of the label DB 30 to the user terminal 10 (S104).

Figure 7:
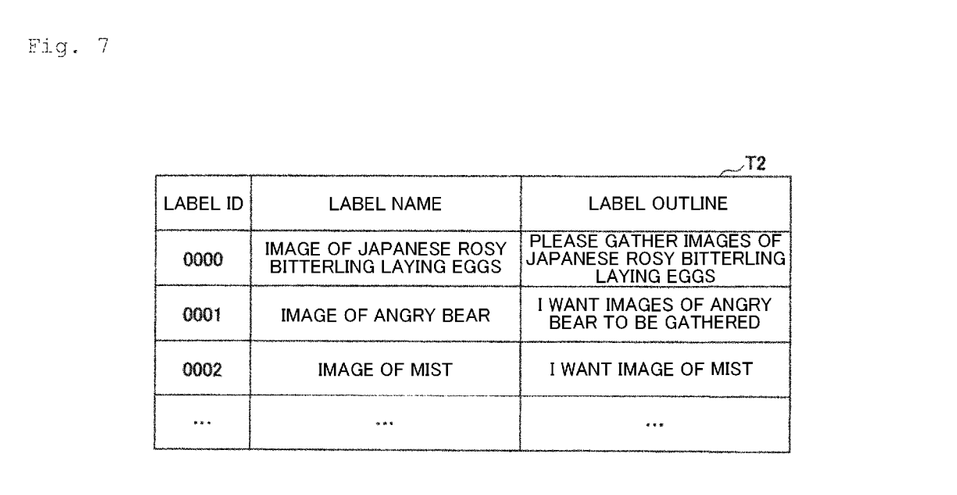
FIG. 7 is a diagram illustrating an example of a configuration of a label table T2.

FIG. 7 is a diagram illustrating an example of a configuration of the label table T2. As illustrated in FIG. 7, the label table T2 includes, for example, a label ID, a label name, and a label outline for each label request representing a request for labeling. The label ID is identification information (ID) of each label request registered in the label table T2. The label name is an entity requested for labeling. The label outline is a character string representing an outline of, for example, a request for labeling relating to the label name.

The label request may be manually registered by an administrator of the labeling server 20, or may be registered by each user. For example, a menu for adding a label may be displayed on a context menu, which is displayed by right-clicking image data on a web page, and a label name and a label outline may be input when the menu is selected. In this case, the user terminal 10 transmits the input label name and label outline to the labeling server 20. The DB management unit 25 of the labeling server 20 registers a record including the label name and the label outline in the label table T2.

In Step S104, a label request list including all the label requests registered in the label table T2 is transmitted to the user terminal 10. When the label request reception unit 14 of the user terminal 10 has received the label request list, the label request selection unit 15 displays a label selection screen based on the label request list (S105).

Figure 8:
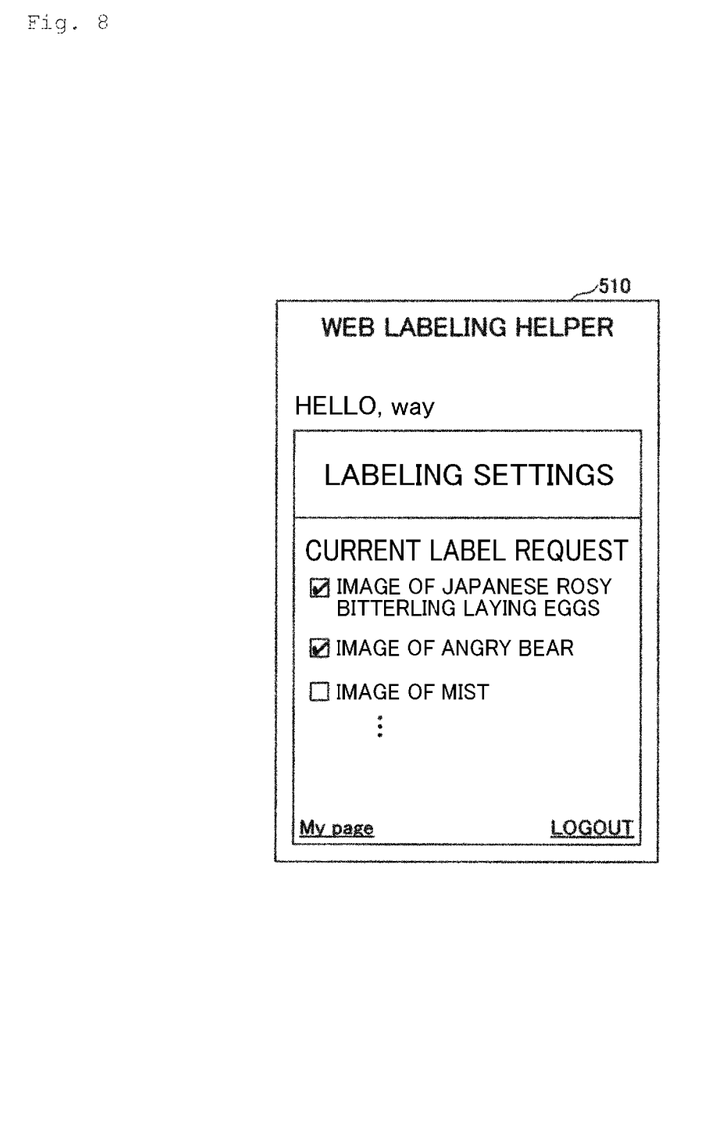
FIG. 8 is a diagram illustrating an example of display of a label selection screen.

FIG. 8 is a diagram illustrating an example of display of the label selection screen. As illustrated in FIG. 8, the label selection screen 510 includes a check button for each label request included in the label request list. When the user has checked (selected) one or more label requests, for which the user desires to be in charge of labeling, from the displayed label request list, the selection menu management unit 16 enables selection of label names (hereinafter referred to as "selected label") associated with the selected label requests together with image data on the web browser 11. As a result, the user can assign any one of the selected labels to image data displayed on any web page.

Specifically, when the user has right-clicked image data included in any web page (S106), the selection menu management unit 16 displays (adds), for example, menu items corresponding to labeling and the selected labels on the context menu displayed by right-clicking (S107).

Figure 9:
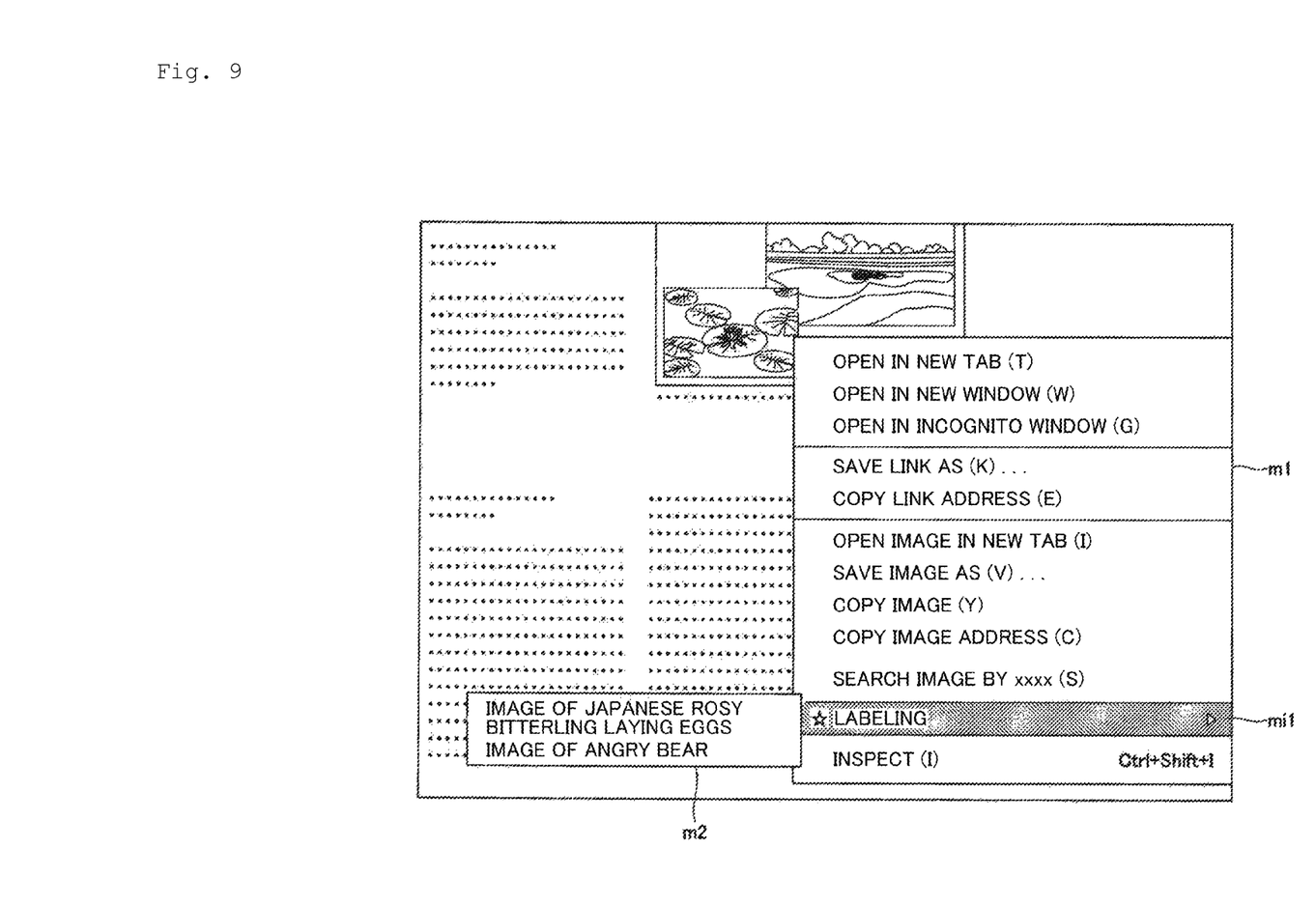
FIG. 9 is a diagram illustrating an example of display of a context menu.

FIG. 9 is a diagram illustrating an example of display of the context menu. FIG. 9 represents an example of adding a menu item mi1 corresponding to labeling in a context menu m1. When a cursor has moved onto the menu item mi1, a sub-menu m2 of the menu item mi1 is displayed. The sub-menu m2 includes a menu item for each selected label.

When the selection menu management unit 16 has detected that the user has selected, from the sub-menu m2, a menu item corresponding to the selected label to be assigned to the right-clicked image data (S108), the label data transmission unit 17 transmits, to the labeling server 20, label data associating a URL (hereinafter referred to as "image URL") of the image, a label ID of the selected label (e.g., "image of angry bear, for example"), and a URL (hereinafter referred to as "page URL") of a web page including the image data with one another (S109). An operation for the image data to be labeled is not limited to right-clicking. For example, a screen (e.g., window or dialog) including a list of selected labels may be displayed in response to other predetermined operations such as double-clicking.

Figure 10:
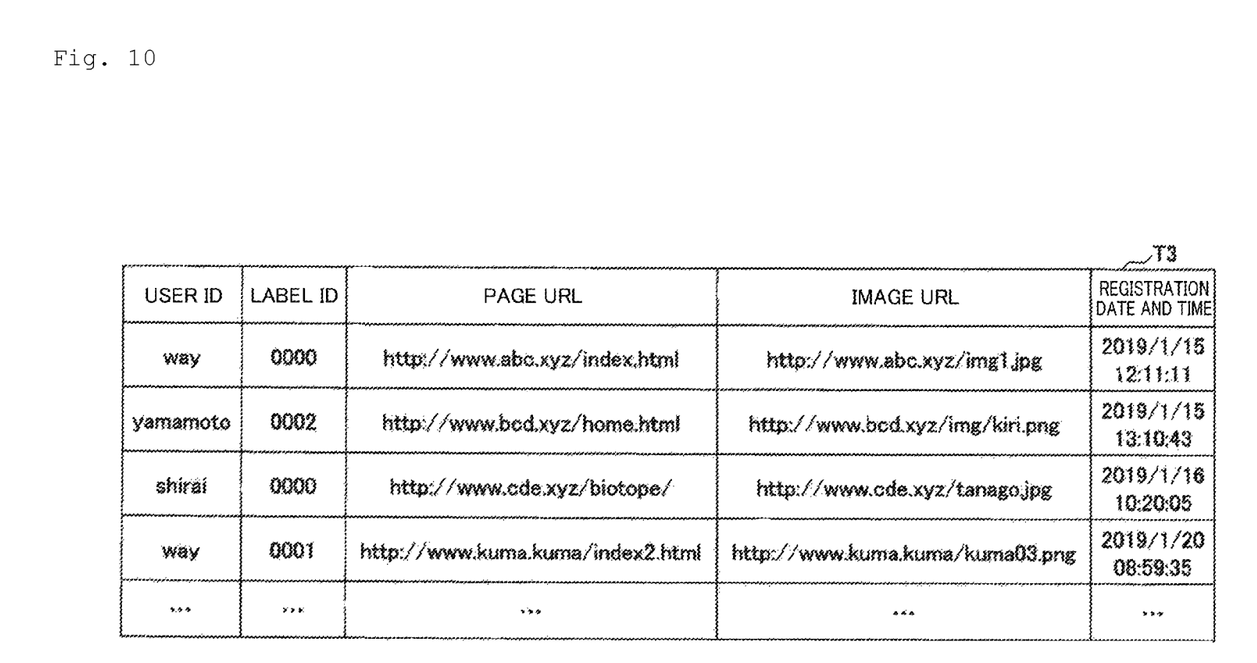
FIG. 10 is a diagram illustrating an example of a configuration of an image data table T3.

When the label data reception unit 24 of the labeling server 20 has received the label data, the DB management unit 25 registers the label data in an image data table T3 of the label DB 30 (S110).

FIG. 10 is a diagram illustrating an example of a configuration of the image data table T3. As illustrated in FIG. 10, the image data table T3 registers a record in which a registration date and time are assigned to label data. The registration date and time are a date and time at which the label data has been registered.

Figure 11:
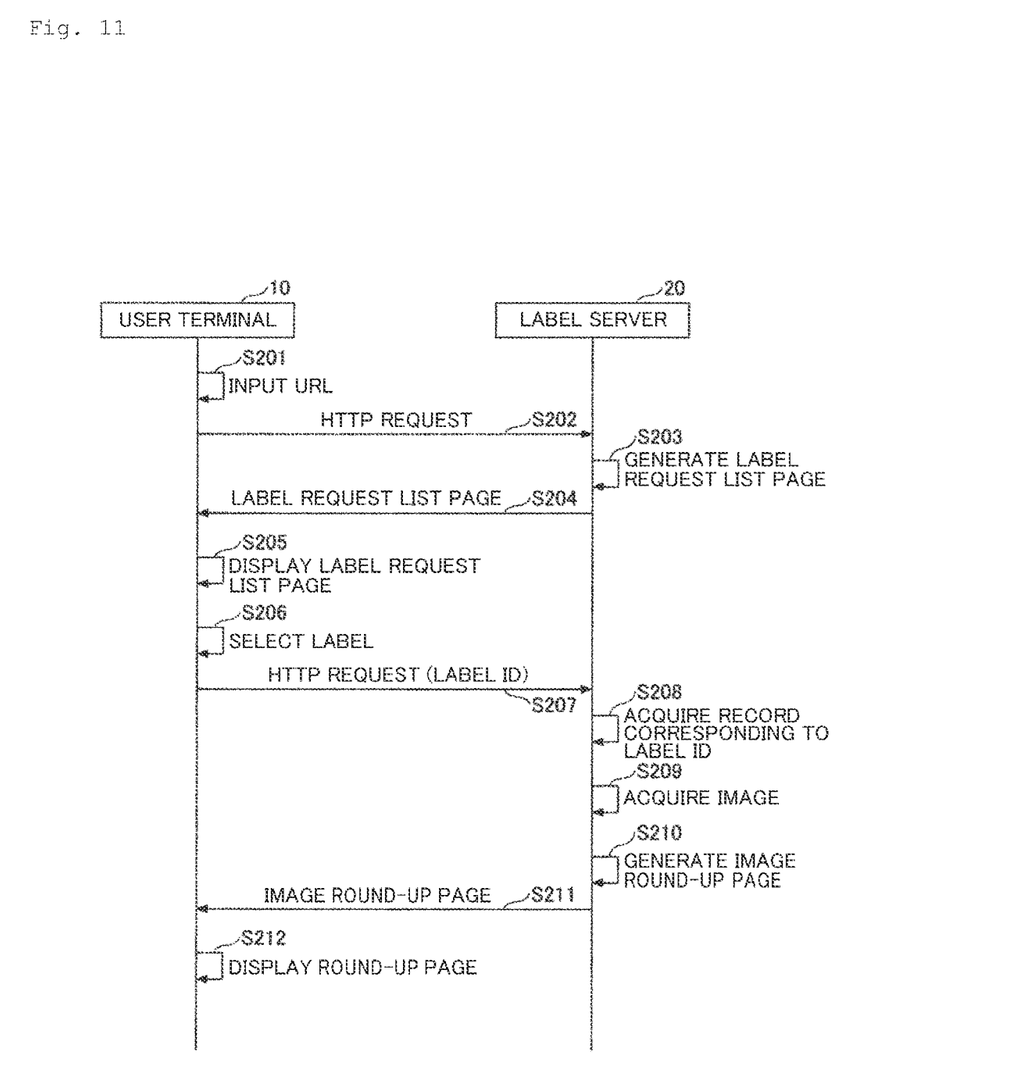
FIG. 11 is a sequence diagram for describing an example of a processing procedure of processing of displaying a round-up page.

FIG. 11 is a sequence diagram for describing an example of a processing procedure of processing of displaying a round-up page. The user terminal 10 in FIG. 11 may be the same as or different from the user terminal 10 in FIG. 4.

When the user has input a URL of the labeling server 20 into an address bar of the web browser 11 of the user terminal 10 (S201), the web browser 11 transmits an HTTP request addressed to the URL (S202).

When the round-up blog generation unit 26 of the labeling server 20 has received the HTTP request, the round-up blog generation unit 26 generates a web page (hereinafter referred to as "label request list page") including the label request list registered in the label table T2 (S203). Then, the round-up blog generation unit 26 returns a response including the label request list page to the user terminal 10 (S204). When the web browser 11 of the user terminal 10 has received the response, the web browser 11 displays the label request list page included in the response (S205).

Figure 12:
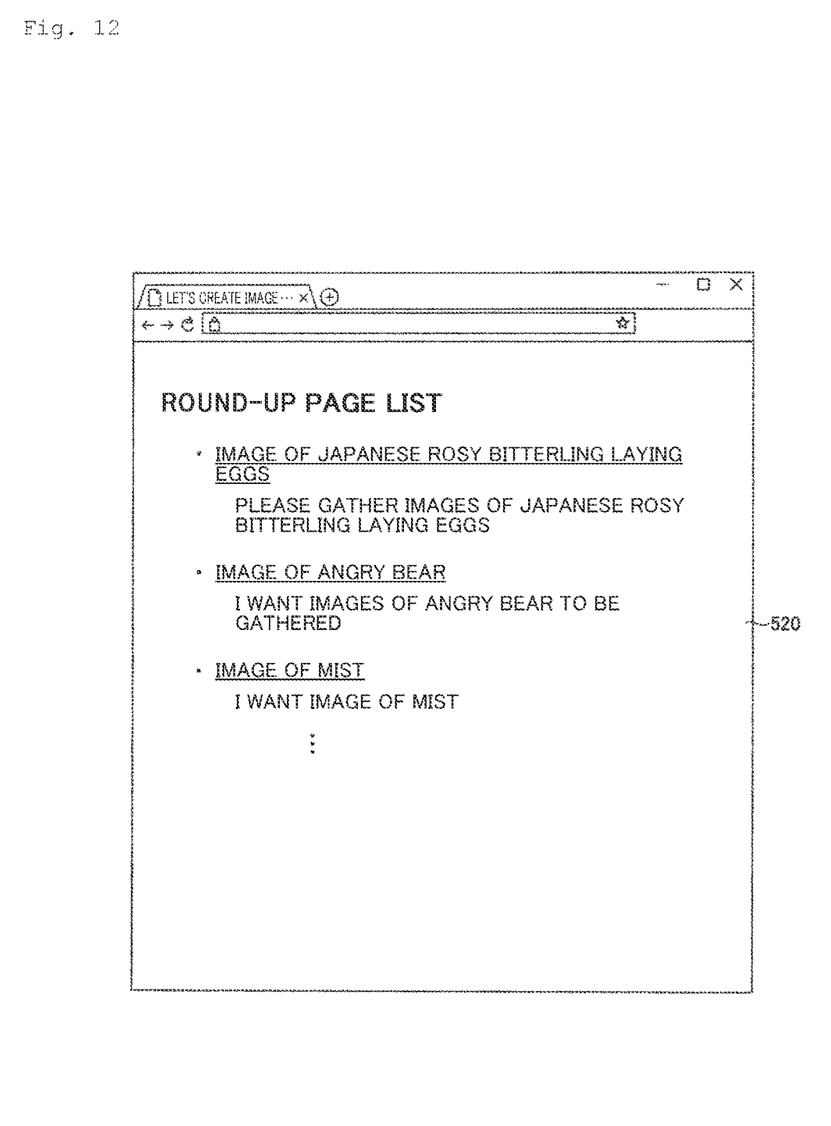
FIG. 12 is a diagram illustrating an example of displaying a label request list page.

FIG. 12 is a diagram illustrating an example of displaying the label request list page. As illustrated in FIG. 12, the label request list page 520 displays the label name and label outline of each label request included in the label request list. A link to the round-up page of image data to which the label associated with the label name is assigned is added to each label name.

When the user has selected (e.g., clicked or tapped) any one of the label names (S206), the web browser 11 transmits, to the labeling server 20, an HTTP request including a label ID recorded in the label request list page 520 in association with the label name (S207).

When the round-up blog generation unit 26 of the labeling server 20 has received the HTTP request, the round-up blog generation unit 26 searches the image data table T3 (FIG. 10) for a record including the label ID included in the HTTP request (S208). Next, the round-up blog generation unit 26 acquires image data associated with an image URL of the retrieved record (hereinafter referred to as "target record") via a network (S209). Next, the round-up blog generation unit 26 generates a round-up page based on the target record and the acquired image data (S210). Next, the round-up blog generation unit 26 returns a response including the round-up page to the user terminal 10 (S211).

When the web browser 11 of the user terminal 10 has received the response, the web browser 11 displays the round-up page included in the response on the display device 106 (S212).

Figure 13:
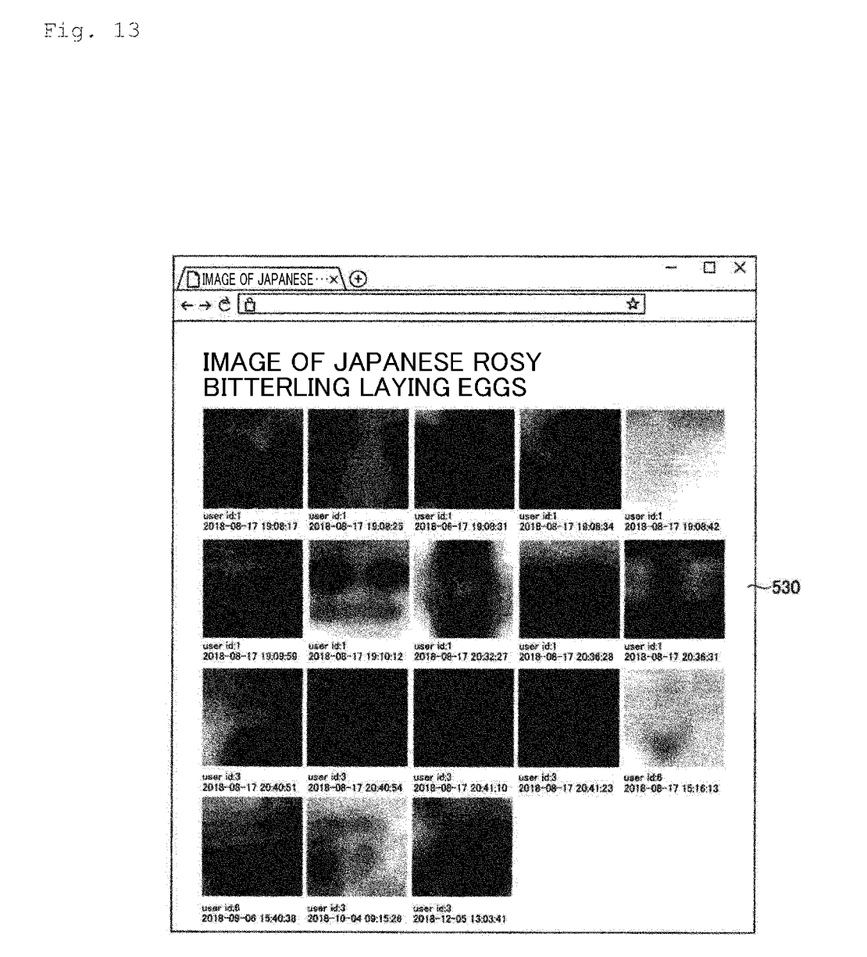
FIG. 13 is a diagram illustrating an example of display of the round-up page.

FIG. 13 is a diagram illustrating an example of display of the round-up page. As illustrated in FIG. 13, the round-up page 530 includes a list of image data to which the label (label name) of "image of Japanese rosy bitterling laying eggs" is assigned.

It is conceivable that the labels selected by the user include incorrect labels in a mixed manner. For example, when a certain user has right-clicked image data and selected the label of "Japanese rosy bitterling laying eggs", the object shown in the image data may be Continental rosy bitterling. In order to prevent such incorrect labeling, a viewer may be asked to evaluate each piece of image data displayed on the round-up page 530.

For example, the round-up blog generation unit 26 generates the round-up page 530 such that two selection buttons of "correct" and "incorrect" are displayed on each piece of image data displayed on the round-up blog. Then, when the viewer has viewed image data on the round-up blog, and has thought the label to be correct, the viewer presses the "correct" button, whereas when the viewer has thought otherwise, the viewer presses the "incorrect" button. For example, the DB management unit 25 registers the count of "correct" and the count of "incorrect" in each record of the image data table T3.

As a result, it can roughly be determined that a label with a high count of "correct" is likely to be correct, whereas a label with a high count of "incorrect" is likely to be incorrect. For example, the DB management unit 25 may delete, from the image data table T3, a record with a high possibility of having an incorrect label based on such information. Furthermore, the round-up blog generation unit 26 may generate a round-up blog such that pieces of image data are displayed in order of the count of "correct" or "incorrect".

Furthermore, each count of "correct" and "incorrect" can be managed for each user ID, to thereby calculate the correctness of selecting a label by each user for all the labels or for an individual label. The reliability of the label selected by each user may be evaluated in this manner.

The labeled image data may be used not only as a component of the round-up blog, but also as training data for machine learning, for example.

In the above, labeling of image data has been described, but this embodiment enables labeling of not only the image data forming a part of a web page, but also various kinds of content on the Internet. For example, it is also possible to assign a label to a substring on a web page, or a moving image or sound file uploaded to the web. In the former case, for example, a label may be assigned from a context menu displayed by selecting and right-clicking a substring by a mouse. In the latter case, a label may be assigned by right-clicking a moving image or sound file in a similar manner.

As described above, in this embodiment, it is possible to achieve more efficient labeling of data by reducing the psychological hurdle to performing a labeling task, and giving a motive through use of a reward other than a financial reward.

Specifically, a method of giving a motive other than a financial reward in a human computation research area includes, for example, a method of embedding a task into another inevitable task or gamifying the task, to thereby facilitate progress of the task. In this embodiment, a reward of easily achieving construction of a round-up blog by users in cooperation with each other is provided as the method of giving a motive, to thereby be able to promote participation in a task of labeling image data.

Furthermore, in this embodiment, a labeling task can be performed on the general-purpose web browser 11, and thus the user can immediately perform a labeling task when the user feels like performing the labeling task. For example, when there is image data to be labeled during another task (e.g., investigation related to work on the web) on the web browser 11, the user can immediately perform labeling by selecting (e.g., right-clicking) a label name for the image data serving as an operation target.

When the label name is selected, a source or URL of image data to be operated and information on the selected label are transmitted to the labeling server 20 and recorded into a database progressively. In other words, as more and more users select a label for image data serving as an operation target, more and more pieces of image data with the label are accumulated in the labeling server 20.

Furthermore, in this embodiment, a round-up page for each label is generated based on the label data and the image data accumulated in the labeling server 20. As a result, the user can overview the image data related to the label on a web page. In other words, in this embodiment, users assist labeling of image data, and at the same time, cooperate with one another to create a round-up blog.

As a result, it is possible to efficiently create image data with a label, which can be used for constructing an image recognizer in machine learning, at a low cost and by a large number of people. The behavior of right-clicking image data and selecting a label to be assigned from the context menu is a behavior that is performed by a large number of people by, for example, copying and pasting during normal web browsing, and the behavior is performed at a higher speed and in a simpler manner than a method of manually inputting a label corresponding to image data, for example. Furthermore, when the label is input manually, spelling inconsistencies occur in labeling (for example, some person may assign a label of "Japanese rosy bitterling" or "JAPANESE ROSY BITTERLING" to image data of Japanese rosy bitterling), but there is no such concern when a predetermined label is selected.

Compared with a conventional labeling assistance tool, first, the following two points result in a lower psychological hurdle to labeling. First, the normally used web browser 11 can be used for labeling, and thus a load such as acquisition of a use method is small. Second, it is possible to immediately perform labeling when finding image data to be labeled during web browsing in another task. A labeling assistance tool independent of the web browser 11 is required to be executed after a tool for labeling is activated (that is, labeling is main task). However, in this embodiment, labeling can be performed as a sub task while another task is performed on the web browser 11.

Next, in this embodiment, the above-mentioned method is used for giving a motive for labeling. As a result, it is considered that a person who is not interested in creating a recognizer of image data corresponding to a label can keep up his or her motive for labeling because a round-up blog relating to the label is developed more as the person performs labeling more.

Lastly, as a secondary effect of this embodiment, the user performs labeling during web browsing in this embodiment, whereas an image search in a search site assumes that image data (address thereof) has been crawled, and thus a label may also be assigned to image data that has nor been crawled.

In this embodiment, the user terminal 10 is an example of a labeling assistance device. The label DB 30 is an example of a storage device. The selection menu management unit 16 is an example of a display control unit. The label data transmission unit 17 is an example of a storage processing unit.

In the above, the embodiment of the present invention has been described in detail, but the present invention is not limited to such a specific embodiment. Various kinds of modifications and changes can be made to the embodiment within the scope of the gist of the present invention described in the appended claims.

REFERENCE SIGNS LIST

10 User terminal
11 Web browser
12 User information input unit
13 User information transmission unit
14 Label request reception unit
15 Label request selection unit
16 Selection menu management unit
17 Label data transmission unit
20 Labeling server
21 User information reception unit
22 User management unit
23 Label candidate transmission unit
24 Label data reception unit
25 DB management unit
26 Round-up blog generation unit
30 Label DB
100 Drive device
101 Recording medium
102 Auxiliary storage device
103 Memory device
104 CPU
105 Interface device
106 Display device
107 Input device
B Bus

The invention claimed is:

1. A computer-implemented method for labeling assistance, the method comprising:
  displaying a list of character strings registered in advance, in response to a predetermined operation of receiving an interactive selection of a piece of data for assigning a label to the piece of data, wherein the piece of data forms a part of a web page, the interactive selection of the piece of data represents a part of a task for generating a round-up blog page, and the list of character strings represents a list of candidate labels for the interactive selection;
  storing a set of the piece of data and a character string selected by a user from the list of character strings as a set of the piece of data and the label of the piece of data into a storage device; and
  generating the round-up blog page, wherein the round-up blog page including the set of the piece of data and the label of the piece of data.

2. The computer-implemented method according to claim 1, further comprising wherein the piece of data includes image data.

3. The computer-implemented method according to claim 2, wherein the list of character strings registered in advance includes one or more character strings, and wherein each of the one or more character strings is used for labeling one or more image data of a plurality of image data displayed on the web page.

4. The computer-implemented method according to claim 3, wherein the round-up blog page is a part of a round-up blog of labeled image data, the labeled image data includes the character string as a label of the image data, and the labeled image data is a part of training data for machine learning.

5. The computer-implemented method according to claim 4, wherein the round-up blog page includes a plurality of selection buttons for interactively receiving a viewer's feedback whether the label of the piece of data correctly corresponds to the piece of the data.

6. The computer-implemented method according to claim 1, wherein the predetermined operation includes the interactive selection of the piece of data displayed on the web page according to at least one of:
  a single right-clicking, a single left-clicking, a double left-clicking, or a double right-clicking.

7. The computer-implemented method according to claim 1, wherein the round-up blog page represents a round-up blog of labeled pieces of data according to a plurality of sets of a character string and a piece of data in the storage device, therein the plurality of sets of a character strings and a piece of data include the set of the character string and the piece of data.

8. The computer-implemented method according to claim 1, further comprising:
  generating, in response to receiving the character string to register as the label used for generating the round-up blog page, the list of character strings;
  receiving an event indicating an occurrence of the predetermined operation, wherein the predetermined operation further includes interactively selecting a region of a display screen by the user as the interactive selection of the piece of data, and the region includes a display of the piece of data;
  receiving an interactive selection of the character string from the list of character strings; and
  generating training data for machine learning, wherein the training data include the set of the piece of data and the label of the piece of data.

9. A labeling assistance device comprising a processor configured to execute operations comprising:
  displaying a list of character strings registered in advance, in response to a predetermined operation of receiving an interactive selection of a piece of data for assigning a label to the piece of data, wherein the piece of data forms a part of a web page, the interactive selection of the piece of data represents a part of a task to generate a round-up blog page, and the list of character strings represents a list of candidate labels for the interactive selection; and
  storing a set of the piece of data and a character string selected by a user from the list of character strings as a set of the piece of data and the label of the piece of data into a storage device.

10. The labeling assistance device according to claim 9, wherein the piece of data includes image data.

11. The labeling assistance device according to claim 10, wherein the list of character strings registered in advance includes one or more character strings, and wherein each of the one or more character strings is used for labeling one or more image data of a plurality of image data displayed on the web page.

12. The labeling assistance device according to claim 11, wherein the round-up blog page is a part of a round-up blog of labeled image data, the labeled image data includes the character string as a label of the image data, and the labeled image data is a part of training data for machine learning.

13. The labeling assistance device according to claim 9, wherein the predetermined operation includes the interactive selection of the piece of data displayed on the web page according to at least one of:
a single right-clicking, a single left-clicking, a double right-clicking, or a double left-clicking.

14. A computer-readable non-transitory recording medium storing computer-executable program instructions that when executed by a processor cause a computer system to execute operations comprising:
displaying a list of character strings registered in advance in response to a predetermined operation of receiving an interactive selection of a piece of data forming a part of a web page, the interactive selection of the piece of data represents a part of a task to generate a round-up blog page, and the list of character strings represents a list of candidate labels for the interactive selection for labeling the piece of data; and
store a set of the piece of data and a character string selected by a user from the list of character strings as a set of the piece of data and the label of the piece of data into a storage device.

15. The computer-readable non-transitory recording medium according to claim 14, wherein the piece of data includes image data.

16. The computer-readable non-transitory recording medium according to claim 15,
wherein the list of character strings registered in advance includes one or more character strings, and wherein each of the one or more character strings is used for labeling one or more image data of a plurality of image data displayed on the web page.

17. The computer-readable non-transitory recording medium according to claim 16, wherein the round-up blog page is a part of a round-up blog of labeled image data, the labeled image data includes the character string as a label of the image data, and the labeled image data is a part of training data for machine learning.

18. The computer-readable non-transitory recording medium according to claim 14, wherein the predetermined operation includes the interactive selection of the piece of data displayed on the web page according to at least one of:
a single right-clicking, a single left-clicking, a double right-clicking, or a double left-clicking.

* * * * *